May 12, 1959 T. BARISH 2,885,767

METHOD OF ASSEMBLING ROLLING BEARING ELEMENTS

Filed Feb. 2, 1955 2 Sheets-Sheet 1

INVENTOR.
THOMAS BARISH
BY
*Frank A. Harman*
ATTORNEY

United States Patent Office 2,885,767
Patented May 12, 1959

2,885,767

METHOD OF ASSEMBLING ROLLING BEARING ELEMENTS

Thomas Barish, Shaker Heights, Ohio

Application February 2, 1955, Serial No. 485,677

3 Claims. (Cl. 29—148.4)

This invention relates in general to rolling bearing assemblies and more particularly to improvements in methods and means of assembling the same in the inner and outer races.

It is the primary object of my invention to provide an improved method and means of assembling the maximum number of rolling bearing elements between inner and outer bearing races without damage to the races or the rolling bearing elements.

With the foregoing and other objects in view, the invention consists in assembling methods, some of which are set forth in the following specification and appended claims, and certain of which are illustrated in the accompanying drawings, in which:

Figure 1 is a diagrammatical illustration of an antifriction rolling bearing assembly including an inner race, an outer race and eleven anti-friction rolling bearing elements interposed therebetween, there being also illustrated pressure blocks exerting radially outward pressure on the inner race and simultaneously applied radially inward pressure by pressure blocks on the outer race in a plane coincidental with the radially outward pressure on the inner race to simultaneously distort both the inner and outer race throughout the subtended angle to permit the introduction of the additional eleventh rolling bearing element, not possible without such simultaneous inner and outer race distortion;

Figure 5:
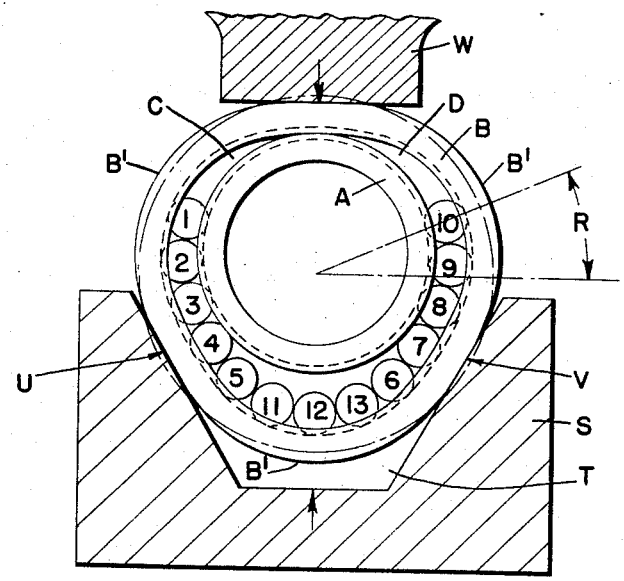
Figure 7:
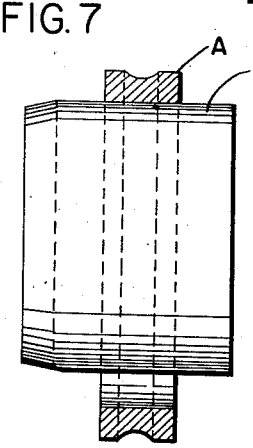
Figure 6:
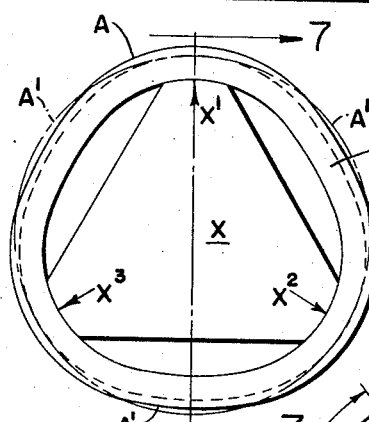
Figure 8:
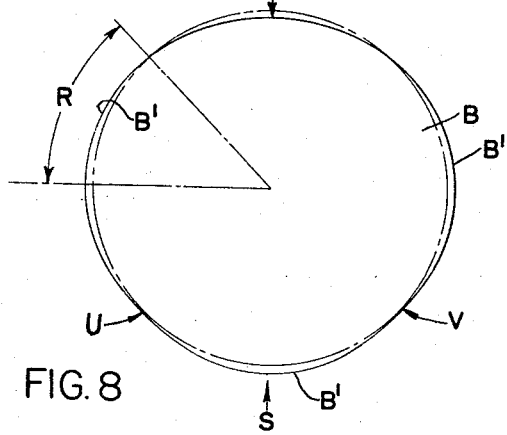
Figure 9:
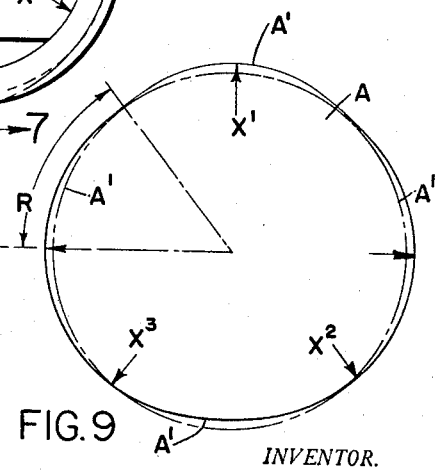

Figure 5 is a similar diagrammatical illustration of a modified form of my invention in which I have provided a special block with a tapered recess to receive the bearing assembly wherein, irrespective of distortion of the inner race, the outer race is compressed vertically radially inwardly, the resultant effect of which is to place the outer race in a state of compression at points at approximately three points at 120 degrees, due to the tapered recess of the block and the point of application of the compressive force;

Figure 6 is a diagrammatical view converse of that shown in Figure 5, in which, irrespective of the outer race, the inner race, instead of being distorted at two points is distorted at three points at approximately 120 degrees;

Figure 7 is a view in section taken along line 7—7 of Figure 6;

Figure 8 is a diagrammatical representation in full and dotted line of the deformation of the outer race in accordance with the practice of the process illustrated in Figure 5; and Figure 9 is a similar illustration of the process of Figure 6.

Figure 1:
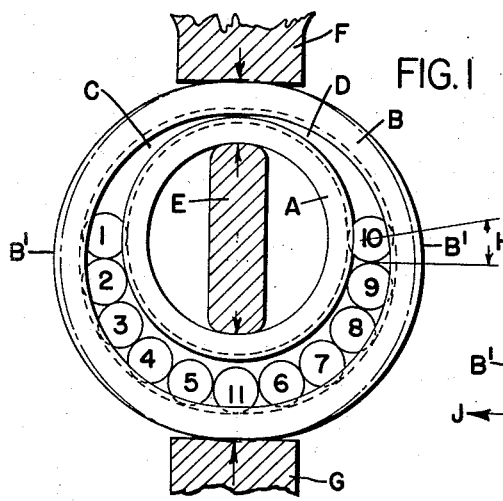

Referring more particularly to the drawings, there is illustrated in Figure 1 a bearing assembly including an inner race A and an outer race B, both of which preferably have uninterrupted side walls, and between which are interposed a series of anti-friction rolling bearing elements. Many approaches have been made to the manipulation of the inner, or outer race, or both, in order to interpose the desired maximum number of bearing rolling elements, including the conventional method illustrated in Figure 1. Here, in order to amplify the capacity for the introduction of additional rolling bearing components between the inner and outer bearing races A and B, having uninterrupted side walls, the races are shifted to maximum eccentricity. As a matter of illustration, this permits the insertion of ten rolling bearing elements 1 to 10, inclusive. This leaves two crescent shaped openings C and D between the top side of the inner race A and the corresponding inside surface of the outer race B. In my process I am enabled to increase the number of rolling elements over the number of ten. I propose to temporarily distort one, or both, of the races out of round in order to enlarge one, or more, of the crescent shaped openings to make room for the insertion of one, or more, rolling elements. The extent to which my process may be practiced is limited to the properties of the materials used in the races. Beyond a certain temporary distortion of the races the distortion may become permanent or the race may break. The conventional practice illustrated in Figure 1 involves the vertical expansion by a suitable expansion tool E exerting an expansive force on the inner ring A, in the direction of the two arrows. Simultaneously, another tool F, G, is exerting a vertical compression on the outer ring B in the opposite directions indicated by the arrows. The effect of this is to transversely horizontally expand the outer race B in the areas B' and B' and to correspondingly elongate the inner race A vertically so as to enlarge the crescent shaped openings C and D sufficiently to insert an additional rolling element 11, while moving the two end elements 1 and 10 further into the expanded openings C and D. The angle H indicates the gain in available space for rolling element insertion.

Figure 2:
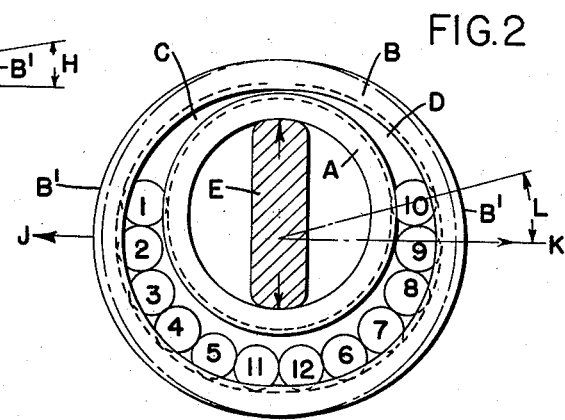
Figure 2 is a similar illustration in which a pressure block is employed to exert a radially outward pressure on the inner race and a radially outward pull simultaneously applied on the outer race in a plane at right angles to the plane of radially outward pressure on the inner race in order to accommodate the insertion of an additional, or twelfth, rolling bearing element.

Figure 2 represents another approach involving vertical expansion of the inner ring A by the tool E and the simultaneous pull along the transverse plane of, and in the direction of, arrows J, K to expand the areas B', B' of the outer race B. This enlarges the angle L over angle H of Figure 1 to permit the insertion of rolling elements 11 and 12 over the original ten before distortion.

Figure 3:
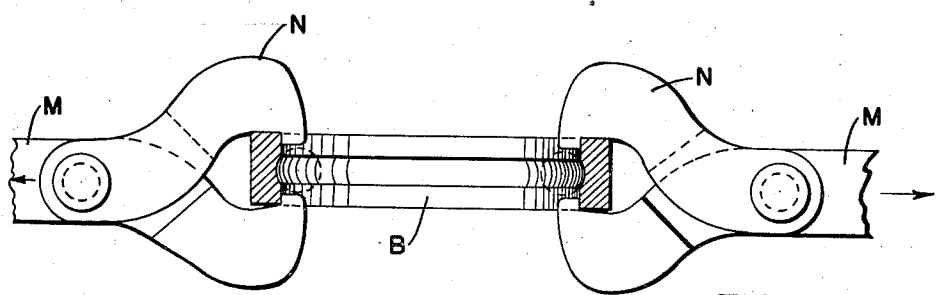
Figure 3 is a diagrammatical view of the outer race and a tool bar exerting a radially outward pull to distort the same in the manner illustrated in Figure 2.

Such a tool for exerting an expanding pull for expansion distortion of either race is diagrammatically illustrated in Figure 3 to have two pull members M with releasable hooks N to grasp the rim of the race to exert a pull on the race rim at circumferentially spaced points.

I have found that distortion of one, or both races, either by expansion, or compression, in a great number of planes than the two illustrated in Figures 1 and 2, makes it possible to insert a greater number of rolling elements after such multiple distortion than was heretofore possible. The method of Figures 2 and 3 provide for seven percent more distortion than that of Figure 1, with the same force and stresses. It is also possible to compress the inner race horizontally, with seven percent greater distortion with the same force and stresses.

Figure 4:
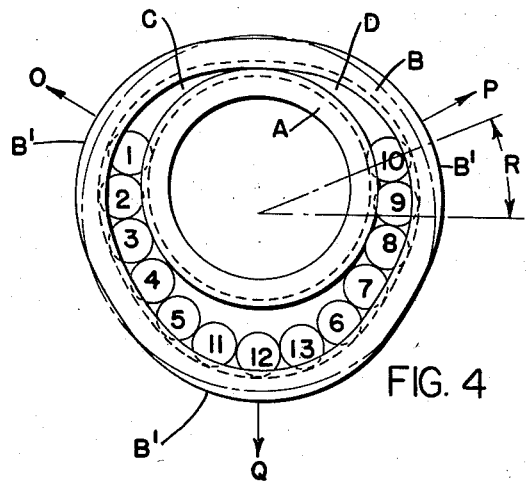
Figure 4 is a diagrammatical illustration of an inner and outer race and interposed rolling bearing elements, in which the outer race is distorted by radially outward pull at three planes at approximately 120 degrees, with or without distortion of the inner race.

As a matter of illustration, I have shown in Figure 4 the inner race A displaced to maximum eccentricity upwardly to contact the inner surface of outer race B. This permits the insertion of ten rolling elements, 1 to 10, inclusive, without race distortion. In this illustrated process, I proposed to utilize such a tool as shown in Figure 3 to exert a simultaneous pull on the outer race B in three planes and directions indicated by arrows O, P and Q to expand the outer race B to distort it outwardly through the three expanded areas B'. The disposition of these three planes is preferably such that the bottom plane Q is on the vertical, whereas planes O and P are approximately 45 degrees to either side of the vertical. This increases the angle R over the angles H and L of Figures 1 and 2, which is the angle subtended by the arc of the rolling elements before redistributing them. Due to this fact, I am now able to separate and distribute the elements in such a manner that elements 1 and 10 become the outside elements, with elements 1 to 5 on one side, elements 6 to 10 on the other side, to leave space for three additional elements 11, 12 and 13 readily inserted therebetween without undue manual force.

A comparable approach is illustrated in Figure 5, where instead of subjecting the outer race B to an expansion pull in three planes, I may elect to subject it to compression at three spaced points. This may be accomplished by providing a V block S with a recess T which is adapted to partially receive the bearing assembly. Vertical compression directly on the outer race B does not force the outer race to the bottom of recess T, which would result in strictly two-point vertical compression, comparable to that shown in Figure 1. On the contrary, the resulting compression action is at points U and V of the slopes of the recess T of the block S and the point of impact of the compression tool W. The resulting action, as illustrated in Figures 5 and 8, with respect to increasing crescent openings C and D, the expanding of areas B' of outer race B and the ease of insertion of rolling elements 11, 12 and 13 is the same as that described in connection with Figure 4. However, the method of Figure 4 provides for seven percent greater distortion than that obtainable with the method of Figure 5, with the same force and stresses.

A comparable approach within my inventive concept is illustrated in Figures 6, 7 and 9. Here, instead of distorting the outer race at three spaced points, and thus in three planes, I propose to expand the inner race at three spaced points, and thus in three planes. This may be accomplished by a triangular expansible block X placed within the inner race A to exert expansive force at upper point X', within the vertical plane, and lower points X² and X³ at approximately 45 degrees to the vertical plane on either side of the vertical. In Figure 6, the three areas of distortion are illustrated at A'. These areas of compression make for additional available room for rolling element insertion comparable to that supplied by the areas of compression B' of outer race B, as described in connection with Figures 4 and 5. The inner race could be compressed at three points.

It is to be understood that the simultaneous use of the three-point compression of the outer race and the three-point expansion of the inner race even further enhances the available additional space for insertion of rolling bearing elements between the two races. By mention of three-point race compression, or expansion, I am thinking in terms of more than two points and not limiting myself to three points. It is to be understood that I may practice any one of the methods described, or combinations thereof, in conjunction with the tilting of the inner race out of coplanar alignment with the outer race in order to increase the available space for bearing rolling element insertion.

I claim:

1. The method of inserting and assembling bearing rolling elements in uninterrupted circular bearing grooves of inner and outer bearing races of a bearing assembly, which comprises disposing said races one within the other in generally coplanar relationship and eccentric to one another, temporarily subjecting one of said bearing races to a strain independently of the bearing rolling elements not greater than the maxmium allowable without permanent distortion or breakage by the direct application of distorting forces at three spaced points on the race one in line with the direction of relative eccentricity between the races and the other two spaced approximately 120° to 140° from the first, inserting a bearing rolling element between the bearing race grooves during such temporary distortion, and subsequently adjusting said races to relative concentricity with the bearing rolling elements disposed in and between the bearing race grooves.

2. The method of inserting and assembling bearing rolling elements in uninterrupted circular bearing grooves of inner and outer bearing races of a bearing assembly, which comprises disposing said races one within the other in generally coplanar relationship and eccentric to one another, temporarily subjecting said bearing races to a strain independently of the bearing rolling elements not greater than the maximum allowable without permanent distortion or breakage by the direct application of distorting forces at three spaced points on each of the races, one in line with the direction of relative eccentricity between the races and the other two spaced approximately 120° to 140° from the first, inserting a bearing rolling element between the bearing race grooves during such temporary distortion, and subsequently adjusting said races to relative concentricity with the bearing rolling elements disposed in and between the bearing race grooves.

3. The method of inserting and assembling bearing rolling elements in uninterrupted circular bearing grooves of inner and outer bearing races of a bearing assembly, which comprises disposing said races one within the other in generally coplanar relationship, and eccentric to one another, temporarily subjecting said bearing races to a strain not greater than the maximum allowable without permanent distortion or breakage by the direct application of distorting forces at three spaced points on each of the races, one in line with the direction of relative eccentricity between the races and the other two spaced approximately 120° to 140° from the first, said distorting forces applied to said outer bearing race being in the form of expansion forces and said first point of application to said outer race being adjacent to the point where the races are farthest apart, inserting a bearing rolling element between the bearing race grooves during such temporary distortion, and subsequently adjusting said races to relative concentricity with the bearing rolling elements disposed in and between the bearing race grooves.

References Cited in the file of this patent

UNITED STATES PATENTS

| 822,723 | Conrad | June 5, 1906 |
| 838,303 | Conrad | Dec. 11, 1906 |
| 2,633,627 | Olmstead | Apr. 7, 1953 |

FOREIGN PATENTS

| 11,353 | Great Britain | May 25, 1908 |
| 615,022 | France | Oct. 1, 1926 |
| 125,542 | Switzerland | Apr. 16, 1928 |